Figure 1:
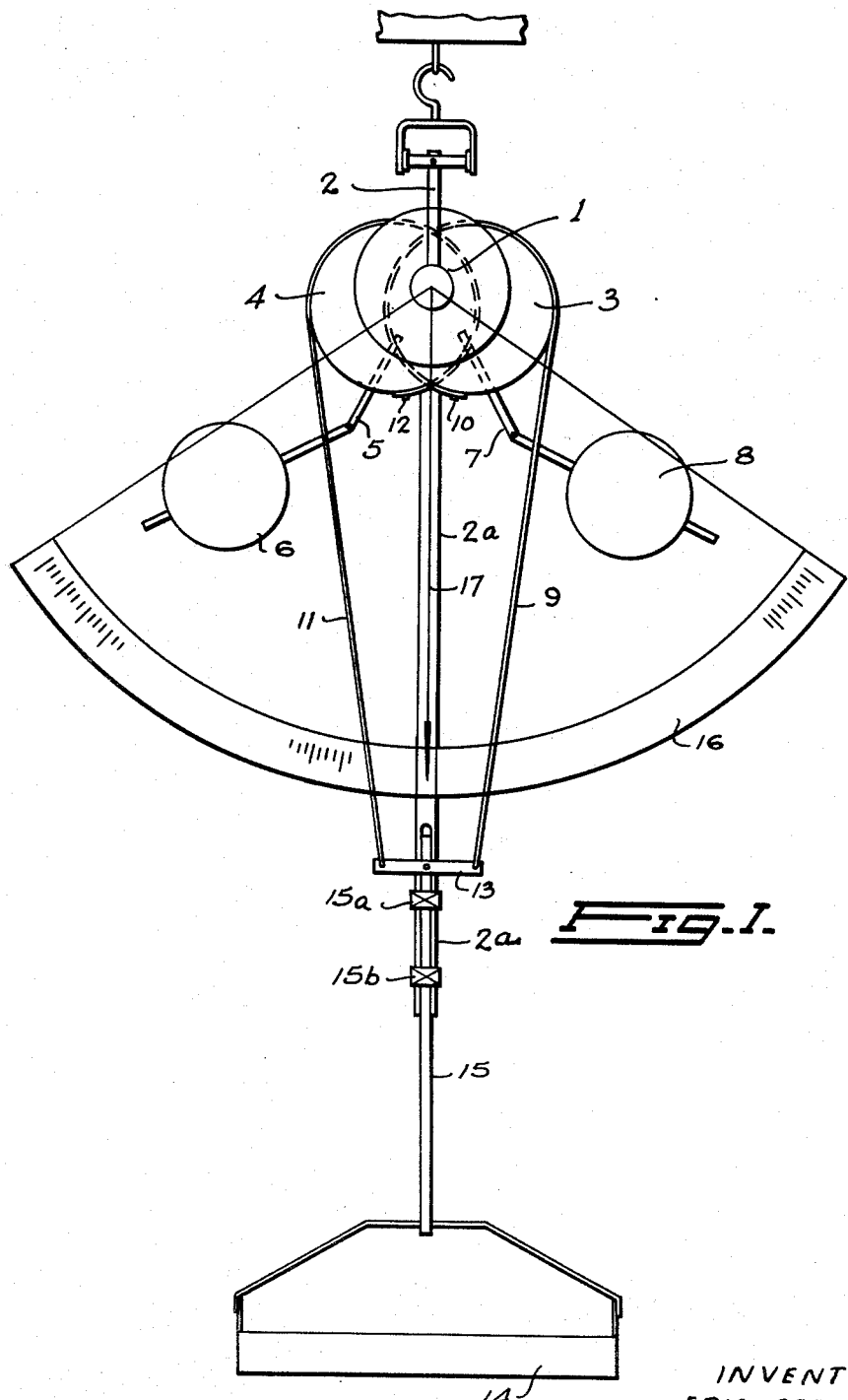

March 23, 1965  E. GREEN  3,174,567
WEIGHING SCALE FOR UNSTABLE MOUNTING
Filed Oct. 11, 1962  4 Sheets-Sheet 1

INVENTOR
ERIC GREEN
By [signature]
PATENT AGENT

March 23, 1965   E. GREEN   3,174,567
WEIGHING SCALE FOR UNSTABLE MOUNTING
Filed Oct. 11, 1962   4 Sheets-Sheet 2

INVENTOR
ERIC GREEN
By [signature]
PATENT AGENT

March 23, 1965 E. GREEN 3,174,567
WEIGHING SCALE FOR UNSTABLE MOUNTING
Filed Oct. 11, 1962 4 Sheets-Sheet 3

INVENTOR
ERIC GREEN
BY
PATENT AGENT

March 23, 1965  E. GREEN  3,174,567
WEIGHING SCALE FOR UNSTABLE MOUNTING
Filed Oct. 11, 1962  4 Sheets-Sheet 4
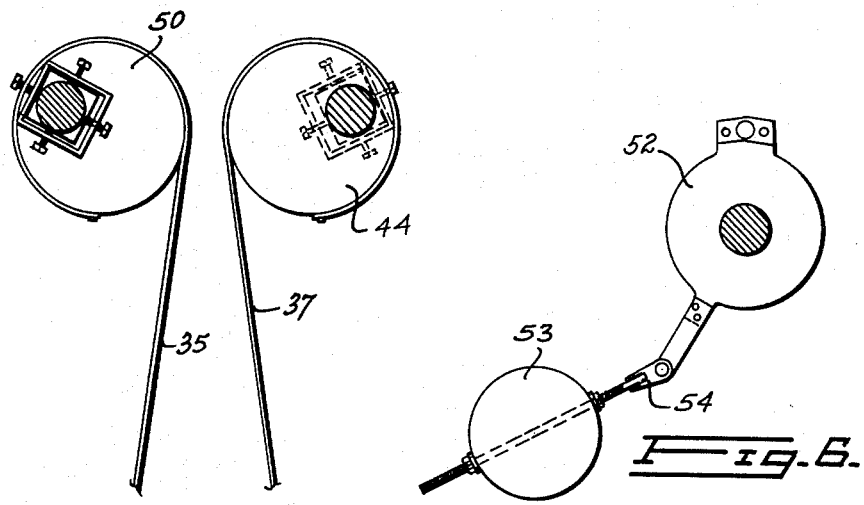
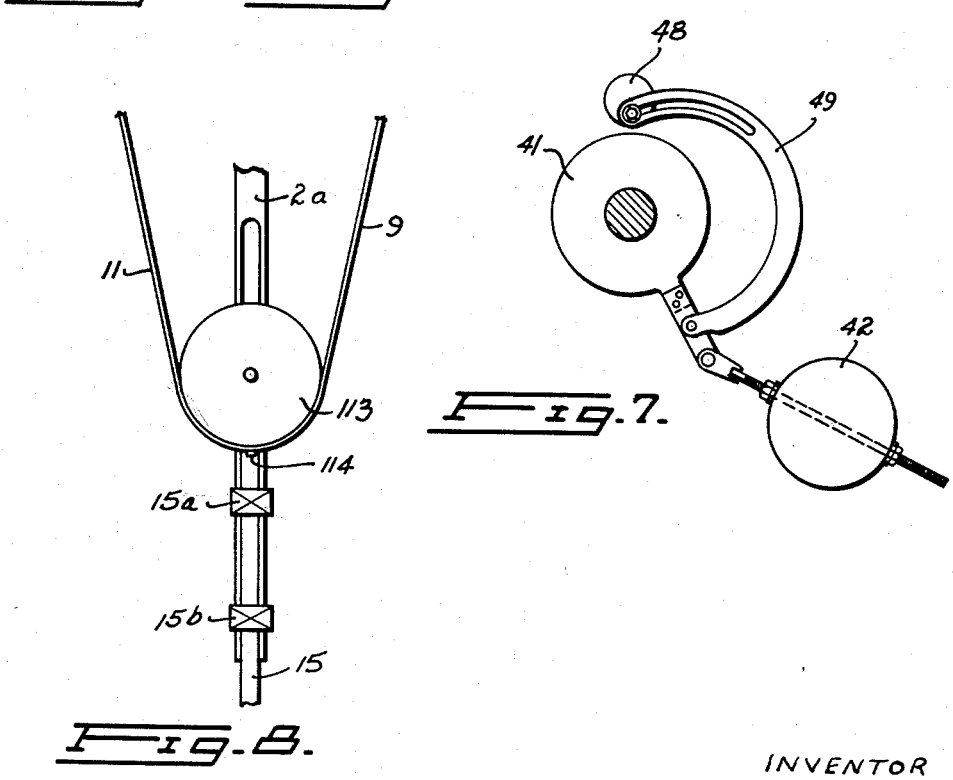
INVENTOR
ERIC GREEN
BY
PATENT AGENT

United States Patent Office
3,174,567
Patented Mar. 23, 1965

1

3,174,567
WEIGHING SCALE FOR UNSTABLE MOUNTING
Eric Green, Ottawa, Ontario, Canada, assignor to National Research Council, Ottawa, Ontario, Canada, a corporation of Canada
Filed Oct. 11, 1962, Ser. No. 229,877
3 Claims. (Cl. 177—219)

This invention relates to a weighing scale for unstable mounting and more particularly to a weighing scale that will give accurate readings of weight even when the scale is mounted on an unstable platform such as the rolling and pitching deck of a ship.

Weighing scales of the pendulum type in which the pull of the load is transmitted by metallic tapes to cam members which in turn activate one or more pendulum weights are well known and in widespread use. In the standard type of scale, the cam members are connected to a pointer which travels over the face of a graduated dial fixed to the frame of the scale. This type of scale gives a very accurate measurement of weight provided the scale frame is mounted on an even and steady surface. A great deal of consideration has been given to different methods of improving the balance and the removal of vibration from this type of scale.

A requirement has arisen for a scale that will weigh fish accurately on board fishing-boats even when the boats are at sea and undergoing severe pitching and rolling motion. The present types of pendulum scales are wholly unsatisfactory for this type of weighing as they require a relatively steady platform. Other types of scales such as spring scales, balances, etc. are also unsatisfactory due to the effect of accelerating forces on the weighing mechanism.

The object of the present invention is to provide a scale that is capable of accurately weighing objects or material when the scale is suspended or supported on an unstable mounting.

Another object of the invention is to provide a weighing scale whose weight readings are relatively independent of the motion of the scale mounting.

These and other objects of the invention are achieved by providing a pendulum scale in which a portion of the force due to the weight of the substance to be weighed is transmitted by a flexible tape to a rotatably mounted first cam member and its attendant pendulum weight and the remaining portion transmitted by a second flexible tape to a second cam member and its attendant pendulum weight mounted in relation to the first said cam member such that a scale pointer attached to the first said cam member and a dial attached to the second said cam member and positioned in relative reading position, will give a reading of the total force due to the weight of the substance.

Figure 2:
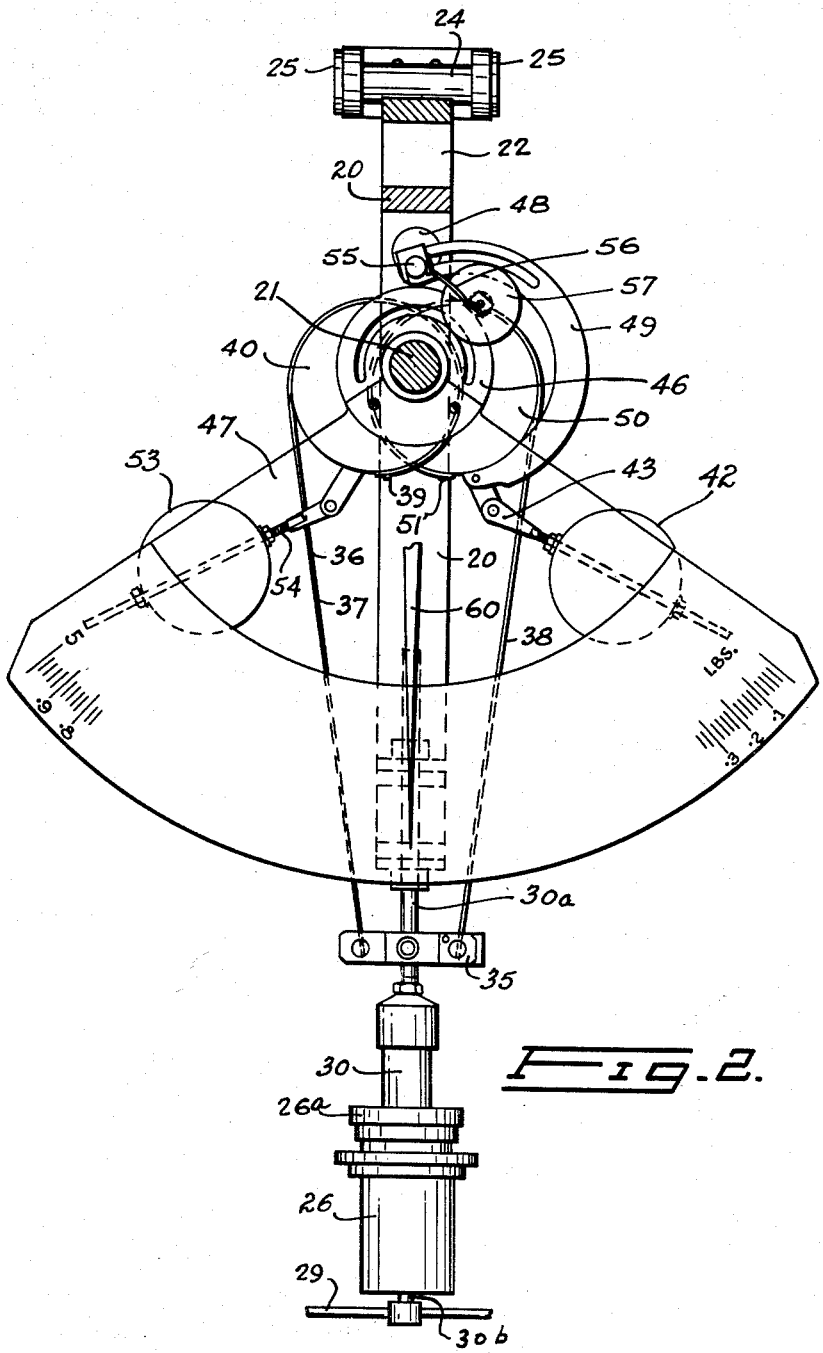
Figure 3:
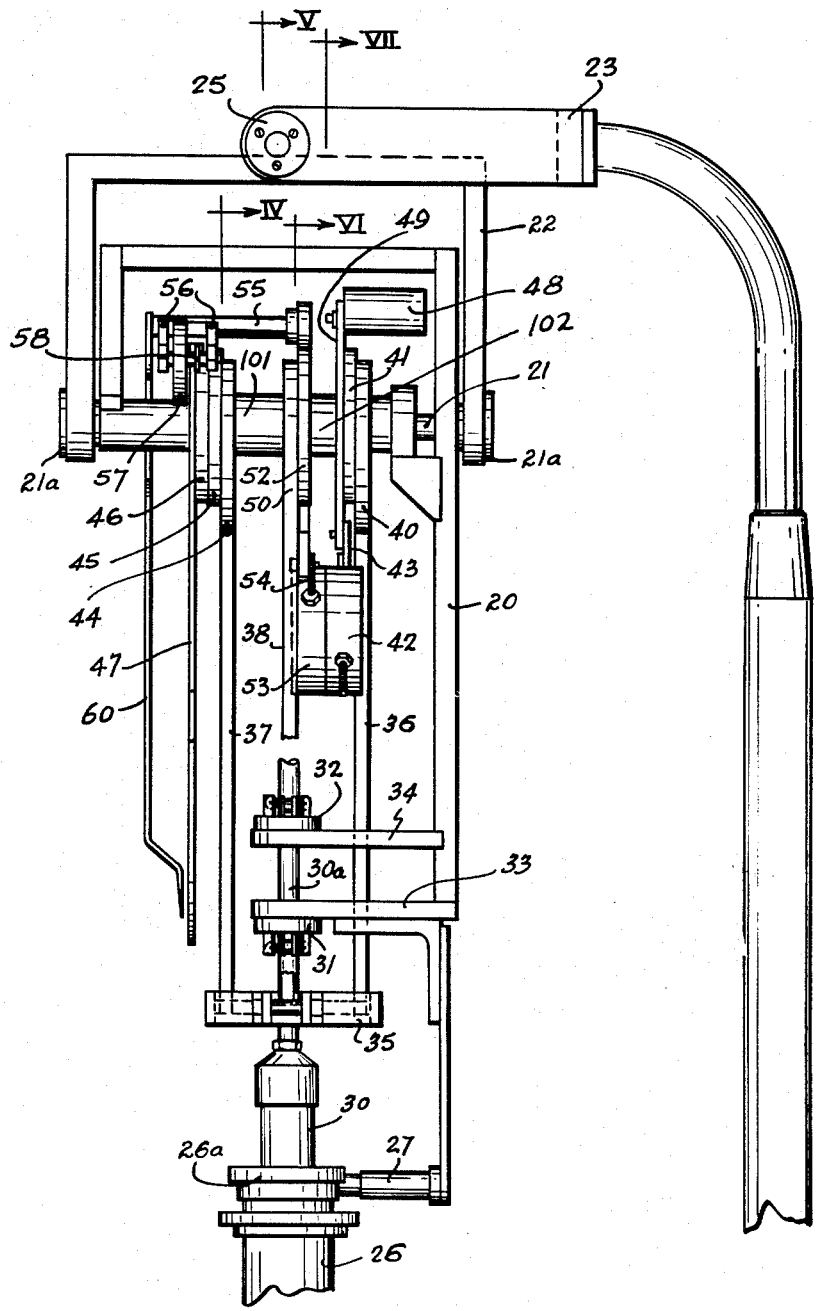

In drawings which illustrate embodiments of the invention,

FIGURE 1 is a representation in schematic form of a scale according to the invention, FIGURE 2 is a front view with housing removed of an actual working scale, FIGURE 3 is a fragmentary side view of the scale shown in FIGURE 2, FIGURES 4 and 5 are views of the cam members with the tape wound thereon, FIGURE 6 is a view of one of the pendulum arms and adjustable weights, FIGURE 7 is a view of a second pendulum arm and weight with counter-weight attached, and FIGURE 8 is a schematic view of an alternative form of weight dividing means.

Referring now to FIGURE 1, a weighing scale according to the invention is shown in schematic form. A horizontal shaft 1 is supported by hanger member 2 which would be freely suspended from some support. Cam members 3 and 4 are eccentrically but independently mounted on shaft 1 and are free to rotate thereon. A pendulum arm 5 having a pendulum weight 6 is rigidly attached to cam 3 and pendulum arm 7 having a pendulum weight 8 is rigidly attached to cam 4. A flexible metallic tape is wound over a portion of the surface of cam 3 and is fixed to cam 3 by any suitable fastening means 10. The free end of tape 9 is connected to one end of yoke 13. Similarly tape 11 is wound over cam 4 and is attached to cam 4 by fastening means 12. The free end of tape 11 is connected to the other end of yoke 13. Weighing pan 14 is pivotally connected by means of hanger 15 to the mid point of yoke 13. A secondary hanger member 2a pivotally mounted on shaft 1 extends downwards as shown and carries bearing members 15a and 15b. The upper portion of hanger 15, which is in the form of a rod, passes through these bearings and is constrained by them to slidable motion only in a generally vertical direction.

A graduated dial 16 is mounted on shaft 1 and is arranged to rotate with cam 4. A pointer 17 is also mounted on shaft 1 and is arranged to rotate with cam 3 and have its position read in relation to dial 16.

If an object is placed in pan 14, a portion of the gravitational force due to the weight of the object is transmitted via yoke 13 and tape 9 to cam 3 which will rotate on shaft 1 due to the unwinding action of tape 9 on its surface swinging pendulum weight 6 outwardly and upwardly until equilibrium is achieved. The remaining portion of the gravitational force due to the object is transmitted via yoke 13 and tape 11 to cam 4 which will rotate on shaft 1 due to the unwinding action of tape 11 on its surface swinging pendulum weight 8 outwardly and upwardly until equilibrium is achieved.

Dial sector 16 rotates with cam 3 about shaft 1 and pointer 17 rotates with cam 4 also on shaft 1. If it is arranged so that pointer 17 travels over a graduated and calibrated scale on dial sector 16, a reading of weight of the object on the pan is obtained. It can be seen that the weight of the object placed on pan 14 is divided into two portions by yoke 13 and each portion is in effect weighed separately by its own pendulum system. The two separate weighings are summed to give the total weight by the arrangement whereby both pointer and dial can move relative to the main body of the scale and also relative to each other.

If the scale is mounted or supported from a point on an unstable mounting such as the rolling and pitching deck of a ship, forces due to this unsteady motion are transmitted to the scale as a whole and it will swing about on its support to a degree depending on the severity of the unsteady motion. Even under these conditions an accurate weighing can be made with the scale. Both dial 16 and pointers 17 will oscillate relative to the scale as a whole but in the same sense so that a reading can be made. As pan 14 carrying the object to be weighed swings to one side or the other, there is a tendency for more or less pull to be transferred to tape 11 and conversely less or more pull to be transferred to tape 9. Pendulum weights 6 and 8 move to new positions to accommodate for this change of force on tapes 9 and 11 and as a result there is a winding or unwinding of tapes 9 and 11 on cams 3 and 4. Yoke 13 is required to take care of the lengthening and shortening of tapes 9 and 11. It should be pointed out that there is no actual change in the pull transmitted in the two tapes (in the system shown it would always be equal) as the tendency for this to happen is immediately taken care of by the pendulum taking up new position and yoke 13 rotating on its pivot to accommodate for the lengthening and shortening of the tapes. Because the weight reading is made relative to both systems an accurate value of weight is obtained while the effect of extraneous forces transmitted to the scale from its unstable mounting are cancelled or minimized.

Swinging motion of the scale in a direction at right angles to that mentioned above, i.e., in a direction normal to the face of the dial, has no appreciable effect on the weight reading. When a swinging motion, such as this, is transmitted to the scale through the mounting, each portion of the scale mechanism and any weight on the pan swings back and forth with the angle of swing of each portion from the vertical always being equal. As a result the complete scale including the pan and any weight on it swings as a whole with all parts keeping the same relative position. Any increase of force on the weight on the pan due to this swinging would be balanced by an exactly equal increase in force on the pendulum weights with the result that change in weight reading would be indicated.

A third form of motion that is transmitted to the scale is a heaving or up and down motion. Because the weighing system is a balanced one, any increase or decrease of force on the weight in the pan due to this motion is balanced by an increase or decrease of force on the balancing pendulum weights. As a result no change in weight reading is obtained because of this type of motion.

A scale with all necessary adjusting, calibrating, and damping features is shown in FIGURES 2 and 3. The main frame 20 of the scale is rotatably mounted on a shaft 21 which in turn is rotatably mounted on end bearings 21a carried by a hanger 22 which is pivotally mounted on a support 23 by means of a second shaft 24 and bearings 25. Frame 20 is in effect mounted in gimbal fashion and is free to swing in all directions. An annular cylindrical housing 26 is fixed to the lower end of frame 2a by extension 27. A hanger 29 which would carry a weighing pan (not shown) or any other suitable structure such as a hook, for holding the articles to be weighed is connected to the lower end of cylindrical rod 30b which is fixed to and concentric with piston 30. This central piston 30 is concentric with cylinder 26 and passes upwards through the center of cover disc 26a. A rod 30a extends upwardly from piston member 30 and slidably passes through bearings 31 and 32 on brackets 33 and 34 rigidly fixed to frame 20. These bearings hold rod 30a in position relative to cylinder 26 but allow linear motion and preferably are arranged to prevent rotation of rod 30a in the bearings. The particular arrangement of the cylindrical housing 26 and piston member 30 is not vital to the operation of the scale but has been chosen so that a dust-free cover (not shown) can be placed around the scale mechanism. This cover would be attached to cover disc 26a. A liquid would be placed in the annular space between cylindrical housing 26 and a downwardly extending cylindrical portion of piston member 30 (not shown) to provide an air-tight seal but still allow relative motion between the two members.

A yoke 35 is pivotally mounted on rod 30a and three metallic ribbons or tapes 36, 37, and 38 are connected to yoke 35 as shown. Three tapes are used rather than two to give symmetry and thus better operation of the scale mechanism. Tape 36 is wound around cam 40 adjustably connected to disc 41 which is rotatably mounted on shaft 21. Tape 36 is connected to cam 40 by pin 39. A pendulum weight 42 is connected to disc 41 by means of pendulum arm 43. Pendulum weight 42 is made adjustable on arm 43 for purposes of centering, calibration, etc. Tape 37 is wound on cam 44 which is adjustably attached to disc 45 rotatably mounted on the shaft.

Disc 45 and disc 41 are shrunk-fit on shaft 21. It can be seen that tapes 36 and 37 and cams 40 and 44 work in unison to actuate pendulum weight 42. Attached to disc 45 is another disc like member 46 which carries a dial sector 47. Ideally, dial sector 47 should be weightless and thus have no effect on the weighing operation but in a practical device this is impossible and therefore it must be counterbalanced. This is achieved by means of counter-weight 48 attached to disc 41 by means of an offset arm 49.

Tape 38 is wound on cam 50 and is attached to it by pin 51. Cam 51 is adjustably attached to a disc 52 which is rotatably mounted on shaft 21. Bushings 101 and 102 are provided to give proper spacing between discs 45, 52, and 41. A pendulum weight 53 is attached to disc 52 by pendulum arm 54. Pendulum weight 53 is adjustable on arm 54 in a similar fashion to pendulum weight on arm 43. In addition, disc 52 carries a rod 55 which extends over the top of cam 44 and disc 45. This rod has attached to it flexible strips 56 which carry a dynamic damping flywheel 57 in suitable bearings attached to the strips. A rubber roller 58 having a much smaller diameter than flywheel 57 is fixed on the same shaft carrying flywheel 57. Rubber roller 58 is positioned to frictionally contact the surface of disc 46. The function of flywheel 57 is to provide dynamic damping of the weighing mechanism. During the weighing operation there is relative movement between disc 46 and rod 55 which is attached to disc 52. Rubber roller 58 rolls on the surface of disc 46 rotating flywheel 57 which provides a damping effect due to the inertia of flywheel 57.

Arm 55 also carrier pointer 60 which is positioned to travel over the face of dial 47.

FIGURES 4 and 5 show the adjustable mounting of any of cams 40, 44, and 50. The cams are offset to compensate for the non-linear movements of the pendulum weights over the range of their travel.

FIGURES 6 and 7 show in more detail the mounting of the pendulum weights on the pendulum arms and also the method of mounting counter-weight 48 by means of offset arm 49.

FIGURE 8 shows in schematic form an alternative to yoke 13 of FIGURE 1. Instead of a yoke, a pulley 113 with tapes connected by pin 114 is used. Pulley 113 is suitably mounted for vertical sliding motion on hanger 2a.

The operation of the scale described in FIGURES 2 and 3 is similar to the scale shown in schematic form in FIGURE 1. The force due to a weight placed on the pan supported by hanger 29 is transmitted by piston 30 and rod 30a to yoke 35. Yoke 35 serves to distribute the load between tape 38 and tapes 36 and 37. Tape 38 by means of cam 50 actuate pendulum 53 and also pointer 60. Tapes 36 and 37 by means of cams 40 and 44 actuate pendulum 42 and also dial sector 47. The measurement of total weight is made by reading pointer 60 against dial 47. Now if the scale is subjected to a swinging or an oscillating motion, due to the unsteadiness of the mounting or support of the scale, the lower part of the scale including the pan and the weight in it will swing back and forth relative to shaft 21. There is a tendency for the force of the pull of the load to shift from tape 38 to tape 36 and 37 and vice versa. This is immediately adjusted for by the pendulum weights taking up new positions with the lengthening and shortening of the tapes taken care of by yoke 35.

In the above description a scale capable of weighing objects in a pitching and rolling location has been disclosed. Several changes would suggest themselves to those skilled in the weighing scale art within the scope of the invention. It should be pointed out that the structure and operation of the pendulum, cams, tapes, pointer, and dial are conventional and no particular invention is claimed for them as such.

What is claimed is:
1. A weighing scale for unstable mounting comprising:
   (a) support means adapted to be freely suspended from a point,
   (b) a shaft horizontally mounted on said support means,
   (c) a first cam rotatably mounted on said shaft,
   (d) a first pendulum weight attached to said first cam by means of a pendulum arm,
   (e) a first tape attached at one end to a point on the surface of the first cam and partially wound thereon,
   (f) a second cam rotatably mounted on said shaft but independent of first said cam,
   (g) a second pendulum weight attached to said second cam by means of a second pendulum arm,
   (h) a second tape attached to a point on the surface of the second cam and partially wound thereon,
   (i) a weight dividing means attached to the free ends of said first and second tapes,
   (j) weight supporting means connected to a mid point on said weight dividing means such that the force of any weight on said weight supporting means will be divided between the first and second tapes,
   (k) means extending from said shaft and rotatably mounted thereon to constrain the said mid point to linear motion generally towards and away from said shaft,
   (l) a dial mounted on said shaft and arranged to rotate with said first cam,
   (m) a pointer mounted in reading relation with said dial and arranged to rotate with said second cam.
2. A weighing scale as in claim 1 in which the weight dividing means is a yoke connected at the ends to the first and second tapes and at its mid point to the said weight supporting means.
3. A weighing scale for unstable mounting comprising:
   (a) a support means adapted to be freely suspended from a point,
   (b) a shaft horizontally and rotatably mounted on said support means,
   (c) first and second cams rigidly mounted on said shaft and in spaced relation to each other,
   (d) pendulum weights attached to each of first and second cams by pendulum arms,
   (e) a first tape attached at one end to a point on the surface of the first cam and partially wound thereon,
   (f) a second tape attached at one end to a point on the surface of the second cam and partially wound thereon,
   (g) a third cam rotatably mounted on said shaft between said first and second cams,
   (h) a pendulum weight attached to said third cam by a pendulum arm,
   (i) a third tape attached at one end to a point on the surface of the third cam and partially wound thereon,
   (j) a weight dividing yoke attached at one end to the said first and second tapes and at the other to the said third tape,
   (k) weight supporting means connected to a mid pivot point on said yoke such that a portion of the force due to any weight on the weight supporting means is transmitted to the said first and second tapes and the remaining portion is transmitted to the third tape,
   (l) a rigid member rotatably mounted on said shaft and extending downwards therefrom,
   (m) bearing means attached to the lower end of the said rigid member arranged to co-act with the upper portion of said weight supporting means such that the pivot point on the weight supporting means is constrained to a motion generally in a line to and from said shaft,
   (n) a dial mounted on said shaft and arranged to rotate with said shaft and first and second cams as a unit,
   (o) a pointer mounted in reading relation with said dial and arranged to rotate with said third cam.

References Cited by the Examiner
UNITED STATES PATENTS

| | | | |
|---|---|---|---|
| 833,922 | 10/06 | Frost | 177—217 |
| 1,614,682 | 1/27 | Osgood | 177—219 |
| 1,735,571 | 11/29 | Hamblin | 177—219 |
| 2,045,974 | 6/36 | Von Pein | 177—218 |

LEO SMILOW, *Primary Examiner.*